(12) United States Patent
Konczak

(10) Patent No.: US 9,016,978 B2
(45) Date of Patent: Apr. 28, 2015

(54) ASPHALT SEALER FOR SURFACE CRACK REPAIR

(71) Applicant: Jeff Konczak, Alpena, MI (US)

(72) Inventor: Jeff Konczak, Alpena, MI (US)

(73) Assignee: SuperGrout Products LLC, Saginaw, MI (US)

(*) Notice: Subject to any disclaimer, the term of this patent is extended or adjusted under 35 U.S.C. 154(b) by 0 days.

(21) Appl. No.: 13/770,342

(22) Filed: Feb. 19, 2013

(65) Prior Publication Data

US 2013/0216306 A1    Aug. 22, 2013

Related U.S. Application Data

(60) Provisional application No. 61/600,289, filed on Feb. 17, 2012.

(51) Int. Cl.
*E01C 11/00* (2006.01)
*C09D 195/00* (2006.01)
*E01C 23/02* (2006.01)
*E01C 7/18* (2006.01)

(52) U.S. Cl.
CPC ............ *C09D 195/00* (2013.01); *E01C 23/026* (2013.01); *C08L 2555/34* (2013.01); *C08L 2555/52* (2013.01); *E01C 7/187* (2013.01); *E01C 11/005* (2013.01)

(58) Field of Classification Search
CPC ... C08L 2555/52; C09D 195/00; E01C 7/187; E01C 11/005; E01C 23/026
USPC ........ 404/72, 75, 17, 19–21, 31, 32, 107, 111
See application file for complete search history.

(56) References Cited

U.S. PATENT DOCUMENTS

| 5,232,306 A * | 8/1993 | Sterner .......................... 404/107 |
| 6,290,428 B1 * | 9/2001 | Hall et al. ......................... 404/75 |
| 7,687,104 B2 * | 3/2010 | Moon et al. ..................... 427/136 |
| 2011/0297049 A1 * | 12/2011 | Zapf et al. ....................... 106/803 |
| 2011/0311307 A1 * | 12/2011 | Sherstyuk et al. ............... 404/75 |

FOREIGN PATENT DOCUMENTS

| EP | 0157749 A2 | 10/1985 | |
| EP | 001291391 | * 3/2003 | ............. C08L 95/00 |
| WO | 2010044822 A1 | 4/2010 | |

OTHER PUBLICATIONS

International Search Report mailed Oct. 2, 2013 (PCT/IB2013/001127).

* cited by examiner

*Primary Examiner* — Raymond W Addie
(74) *Attorney, Agent, or Firm* — Dickicson Wright PLLC

(57) ABSTRACT

A method of repairing cracks in a paved surface includes identifying at least one crack in the surface that needs to be repaired. The crack is then filled with an asphalt sealer including approximately 40-55% by weight of slag sand.

8 Claims, 2 Drawing Sheets

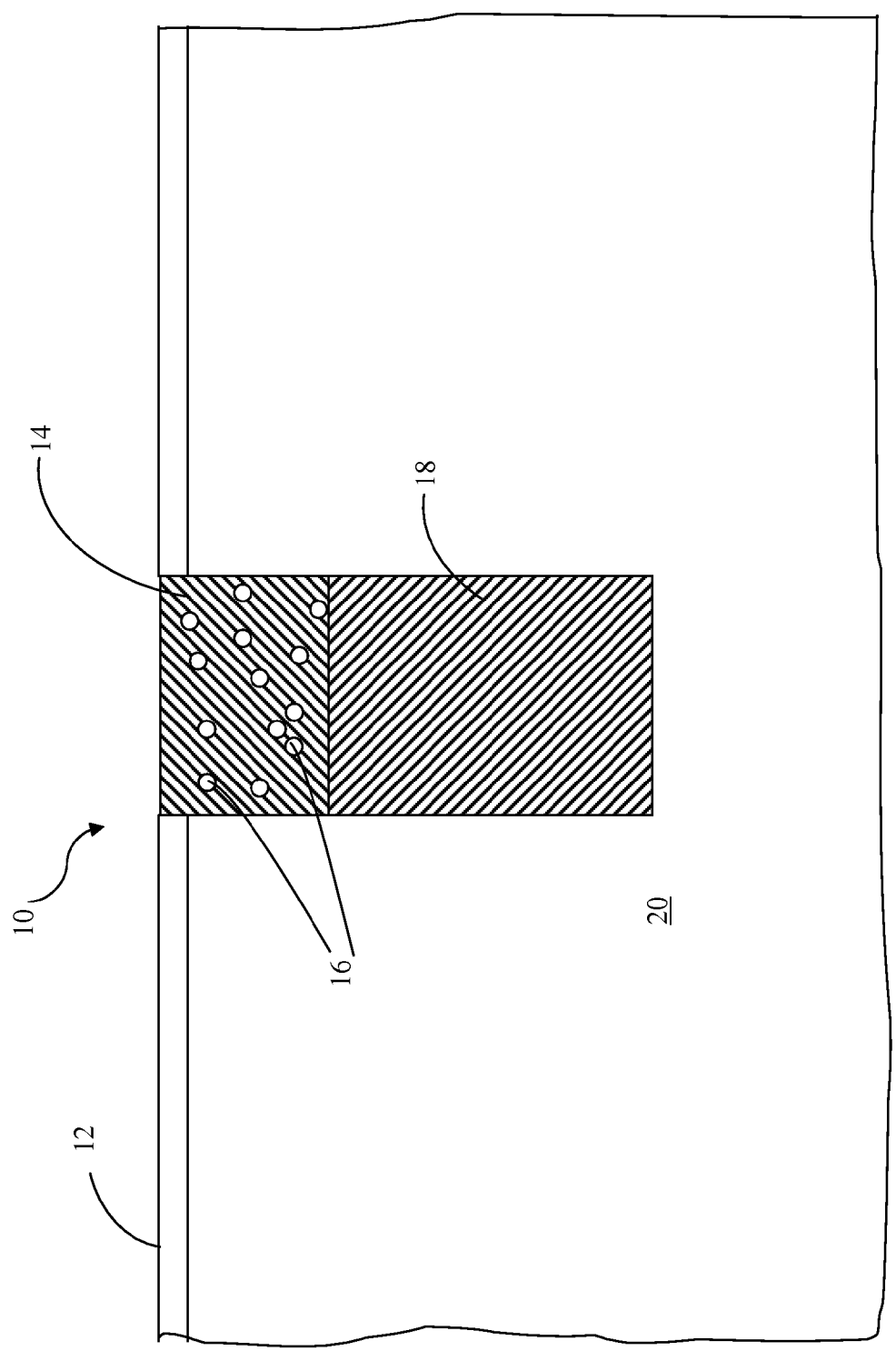

ASPHALT SEALER FOR SURFACE CRACK REPAIR

CROSS-REFERENCE TO RELATED APPLICATIONS

The present application claims priority to U.S. Provisional Patent Application Ser. No. 61/600,289, filed Feb. 17, 2012 and entitled "Asphalt Sealer for Surface Crack Repair", the disclosure of which is hereby incorporated by reference.

TECHNICAL FIELD

The present invention relates generally to an asphalt sealer for filling cracks in paved surfaces. More specifically, the present invention relates to an improved asphalt sealer for filling cracks in asphalt surfaces that provides significantly improved performance and durability, particularly in areas of high temperature.

BACKGROUND OF THE INVENTION

It is well known that paved surfaces, such as roadways, sidewalks, driveways, tennis courts and the like, can develop cracks, which necessitate repair. These cracks often develop over time, but can also appear in new paved surfaces. Asphalt surfaces in particular are susceptible to developing cracks in regions that have extreme weather conditions or that have large temperature fluctuations. It is desirable to repair these cracks to preserve the longevity of the entire asphalt surface as well as to prevent damage or injury to those using the surface.

One way to eliminate cracks from paved surfaces is to tear it up and replace the entire surface. This process is extremely expensive. It is also not practical to replace the entire surface, which has many more years of useful life, because cracks have formed in a small portion of the surface.

Instead of ripping up an entire paved surface, various less expensive methods have been employed to repair cracks that may develop in these surfaces. One known process is to fill the cracks with an asphalt sealer. While this often serves to fill the cracks at least temporarily, the utilization of current asphalt sealers to repair cracks suffers from some significant disadvantages. Initially, current asphalt sealers are susceptible to melting when subjected to high temperatures, which results in the sealer flowing away from a crack filling position. For example, when the asphalt sealer heats up, it becomes softer and can be squeezed, such as by a vehicle passing thereover, so that it no longer properly fills the crack. Additionally, because of their composition, current sealers can be slippery, which is undesirable. As existing asphalt sealers have very limited durability when serving to fill cracks, if the sealer no longer serves to fill the crack, additional crack repair services are required. Accordingly, existing crack repair methods and systems are costly, both in terms of material and labor.

In some instances where the crack is deep enough, a grout material, such as a mortar or cement, is used to assist in filling these cracks. In these instances, the grout material is placed in the crack and allowed to harden. Thereafter, the asphalt sealer is placed in the crack over top of the grout material to completely fill the crack and level out the paved surface. This can also create durability issues in that existing grout fillers that are used in crack repair applications often have significant shrinkage issues. Thus, while an asphalt sealer used to help fill a crack may initially be level with the surface being repaired, when the grout material shrinks, the asphalt sealer will drop into the crack as the level of the grout material recedes. The asphalt sealer thus is no longer flush with the upper paved surface and often falls into the crack itself.

In an effort to address some of these deficiencies, aggregates such as sand or limestone, were added to the asphalt sealer to provide it with more substance. However, these efforts were unsuccessful as these aggregates would release from the sealer, such as when contacted, and they would therefore eventually fail. Thus, while they provided some increased durability, they ultimately suffer from the same disadvantages as asphalt sealers without an aggregate.

It would therefore be advantageous to provide an improved asphalt sealer for paved surfaces that overcomes these disadvantages. It would also be advantageous to provide an improved crack repair system that overcomes the failings with current systems.

SUMMARY OF THE PRESENT INVENTION

It is therefore an aspect of the present invention to provide an improved asphalt sealer for paved surfaces that provides increased durability over existing systems.

It is another aspect of the present invention to provide an improved asphalt sealer for paved surfaces that decreases the cost associated with repairing cracks.

It is still another aspect of the present invention to provide an asphalt sealer crack repair system that can withstand extreme weather conditions and large temperature fluctuations.

It is yet another aspect of the present invention to provide an improved asphalt sealer, which has increased structural integrity and bonding.

It is a further aspect of the present invention to provide an improved asphalt sealer having no-skid characteristics.

It is yet a further aspect of the present invention to provide an improved asphalt sealer that utilizes an aggregate material.

It is still a further aspect of the present invention to provide an improved crack repair system that employs an asphalt sealer over top of a grout material, which provides increased durability and decreased cost.

In accordance with the above and the other aspects of the present invention, an improved asphalt sealer for repairing cracks in a paved surface is provided. The asphalt sealer includes slag sand that is mixed therein in an amount of approximately 40-55% by weight of slag sand. The addition of the slag sand yields a sealer that has improved structural integrity and increased durability. To repair one or more cracks in the paved surface, the improved asphalt sealer with slag sand is placed into the crack to fill it and allowed to harden.

BRIEF DESCRIPTION OF THE DRAWINGS

FIG. 2 is a schematic illustration of a crack repair system in accordance with another preferred embodiment of the present invention.

DETAILED DESCRIPTION OF THE PREFERRED EMBODIMENTS

Figure 1:
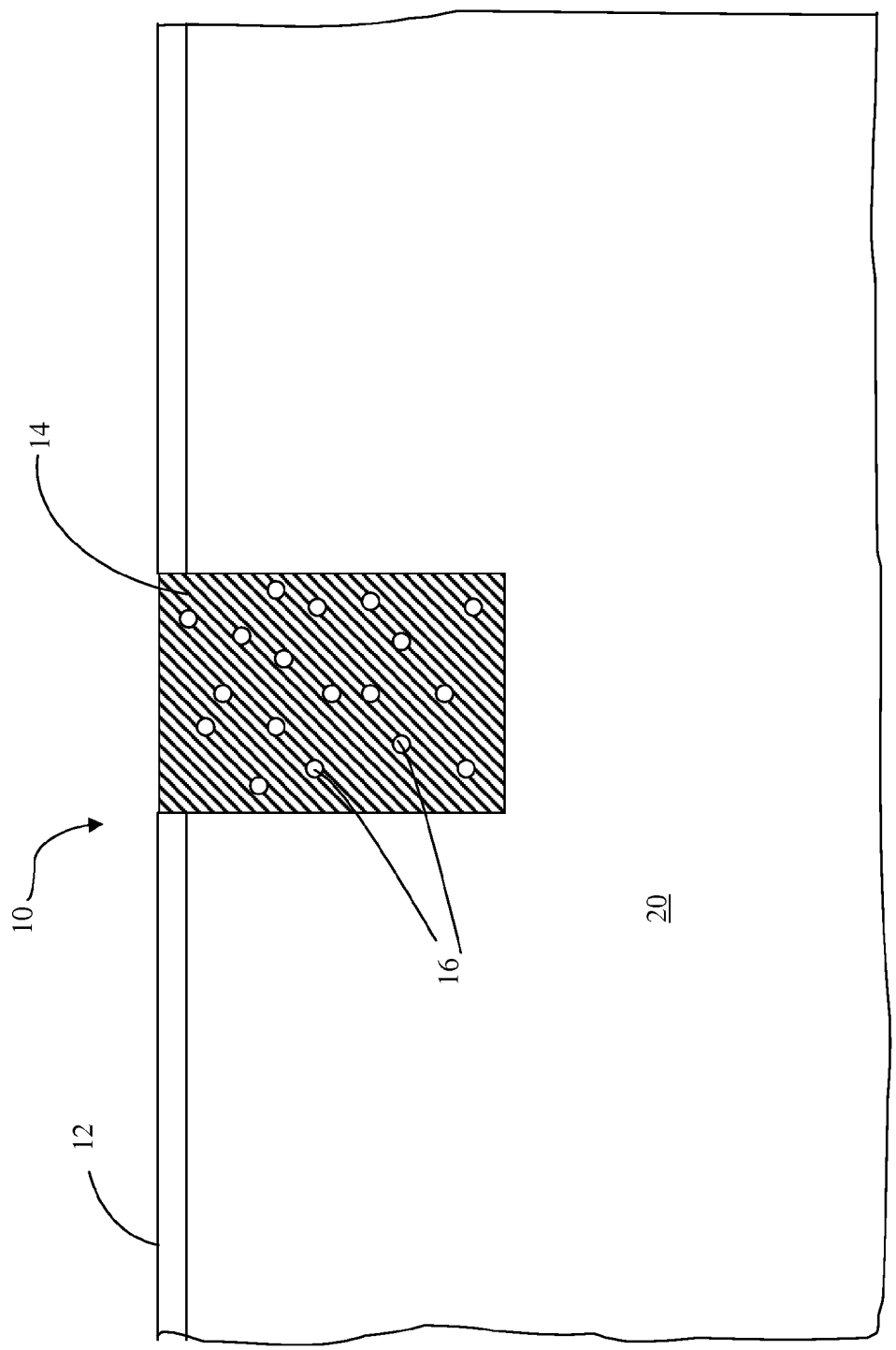
FIG. 1 is a schematic illustration of a crack repair system in accordance with a preferred embodiment of the present invention.

The present invention relates to an improved asphalt sealer for use in repairing cracks in a paved surface, such as an asphalt surface. The paved surface can be any type of surface, including a roadway, a parking lot, a driveway, a sidewalk, a tennis court, a basketball court, a track or the like. While the present invention is preferably for use with asphalt surfaces, it will be understood that it may also be used in connection with any other type of paved surface, such as concrete surfaces. It may also be used in connection with non-paved surfaces.

It is known that over time whether due to extreme weather, large temperature fluctuations or other factors, cracks can form in paved surfaces, such as asphalt surfaces. In accordance with a preferred embodiment, a crack 10 in a paved surface 12 is identified as needing repair. It will be understood that the cracks often extend into the ground 20 for some distance as well. To fill and repair the crack, an asphalt sealer 14 is placed therein such that it fills the crack and substantially levels out the paved surface on either side of the crack. It will be appreciated that the crack can be filled to varying degrees and heights, as desired. For example, the asphalt sealer could fill the crack to a level above or below the adjacent paved surface. In accordance with a preferred embodiment, the asphalt sealer 14 used to fill the crack may consist of a conventional asphalt sealer mixed with slag sand 16 in an amount of approximately 40-55% by weight of slag sand. More preferably, slag sand 16 is utilized in an amount of approximately 48% by weight. In another composition, 30 lbs of sealer are mixed with 25 lbs of slag sand. To mix the slag sand, the asphalt sealer 14 is melted and then the slag sand 16 is added such that when the asphalt sealer 14 hardens, the slag sand 16 is firmly bonded thereto. Alternatively, the asphalt sealer 14 could be delivered to the site where needed premixed such that the sealer and the slag sand are already combined.

An asphalt sealer 14 having the following specific chemical identity may be employed (CA5 8052-42-4). However, other asphalt sealer compositions may also be utilized. The slag sand may be of the air cooled blast furnace type (ACBF) and is preferably 316 in size. It will be understood that other types of slag sand 16 may also be employed as well as slag sand of other sizes. In accordance with a preferred embodiment, the disclosed asphalt sealer has a specific gravity of 1.0-1.3 and a melting point of 160-220° F. It will also be appreciated that other types of aggregates that exhibit similar characteristics, as desired herein, may also be employed.

The disclosed asphalt sealer 14 has been tested and provides significantly increased durability particularly in areas, such as the Southwest United States where high temperatures and large temperature changes can cause existing asphalt sealers to fail. For example, the temperature changes in Las Vegas, New Mexico, Arizona, or Southern California can be between 60-95° F. These large temperature changes are known to cause existing asphalt sealers to fail. The inclusion of the slag sand provides structural integrity and a mechanical bond to the asphalt sealer. Additionally, the inclusion of the slag sand 16 minimizes softening and flowing of the sealant when the ground temperature is hot as the improved sealer has a higher melting point. Further, the slag sand provides an abrasive characteristic that minimizes slipperiness. Moreover, the asphalt sealer has been tested through observation and manipulation and once the slag sand has been mixed in the asphalt sealer, it does not readily separate, which provides significantly increased durability.

Turning to FIG. 2, which illustrates another preferred embodiment of the present invention. As shown, a crack 10 has formed in a paved surface 12, which has been identified as needing repair. It is not critical how the creaks are formed, as they could be created intentionally to install utilities underground. In this embodiment, the crack is relatively large and therefore a grout material 18 is placed into the crack 10 to fill a part thereof. The grout material 18 preferably includes class F fly ash in a range of approximately 0 to 30% by weight of the grout material and cement kiln dust in a range of approximately 50 to 90% by weight of the grout material, such as is disclosed in Applicant's co-pending U.S. patent application Ser. No. 12/885,101, entitled "Grout for Filling a Micro-Trench", and filed on Sep. 17, 2010, the disclosure of which is hereby incorporated by reference. According to a preferred aspect, the Class F fly ash has the composition of that produced by the Lafarge facility in Alpena, Mich. This preferred grout material 18 resists shrinkage and therefore will keep the crack filled after it hardens. In other words, the grout material 18 remains in contact with the sides of the crack to keep it substantially filled. It will be understood that other grout materials may also be employed. It will also be understood that the disclosed asphalt sealer may be used to fill the entire crack.

After the grout material 18 has been placed in the crack 10, the asphalt sealer 14 with slag sand 16 can then be placed over the grout material 18 to fill the remaining part of the crack 10 and also level off the surface being repaired. The disclosed asphalt sealer 14 provides an additional benefit when utilized with the preferred grout material 18 as the asphalt sealer 14 bonds strongly to the grout material 18 as a result of their compositions, as disclosed herein. It will also be appreciated that the asphalt sealer 14 may be utilized to fill the entirety of the crack 10. Thus, a crack repair system consisting of the preferred grout material 18 and the preferred asphalt sealer 14 provided significantly enhanced durability.

Obviously, many modifications and variations of the present invention are possible in light of the above teachings and may be practiced otherwise than as specifically described. These antecedent recitations should be interpreted to cover any combination in which the inventive novelty exercises its utility.

What is claimed is:

1. A method of repairing cracks in a paved surface comprising:
    Identifying at least one crack in a paved surface to be repaired;
    Substantially filling said at least one crack with an asphalt sealer including approximately 40-55% by weight of an air cooled blast furnace sand; whereby said asphalt sealer can withstand large temperature deviations without failing;
    partially filing said crack with a grout material; and placing said asphalt sealer on said grout material.

2. The method of claim 1, wherein said asphalt sealer includes approximately 48% by weight of said air cooled blast furnace sand.

3. The method of claim 1, wherein said grout material, includes class F fly ash in a range of approximately 0 to 30% by weight of said grout material and cement kiln dust in a range of approximately 50 to 90% by weight of said grout material.

4. The method of claim 1, wherein said paved surface is an asphalt surface.

5. A method of repairing cracks in a paved surface, comprising:
    identifying at least one crack in a paved surface to be repaired;
    at least partially filling said at least one crack is an asphalt sealer including approximately 40-55% by weight of an air cooled blast furnace sand, whereby said asphalt sealer can withstand large temperature deviations without failing; and
    partially filling said crack with a grout material; and placing said asphalt sealer on said grout material.

6. The method of claim 5, wherein said asphalt sealer includes approximately 48% by weight of said air cooled blast furnace sand.

7. The method of claim 5, wherein said grout material includes class F fly ash in a range of approximately 0-30% by weight of said grout material and cement kiln dust in a range of approximately 50-90% by weight of said grout material.

8. The method of claim 5, wherein said paved surface is an asphalt surface.

\* \* \* \* \*

UNITED STATES PATENT AND TRADEMARK OFFICE
CERTIFICATE OF CORRECTION

PATENT NO. : 9,016,978 B2  
APPLICATION NO. : 13/770342  
DATED : April 28, 2015  
INVENTOR(S) : Jeff Konczak Page 1 of 1

It is certified that error appears in the above-identified patent and that said Letters Patent is hereby corrected as shown below:

In the specification:

Column 4, Line 61, is: should read – "with".

Signed and Sealed this
Seventeenth Day of November, 2015

Michelle K. Lee
*Director of the United States Patent and Trademark Office*